(12) United States Patent
Ritter et al.

(10) Patent No.: US 6,925,375 B2
(45) Date of Patent: Aug. 2, 2005

(54) SYSTEM AND METHOD FOR DETERMINING A PARAMETER SET FOR AN ENGINE CONTROLLER MODULE

(75) Inventors: Curtis Paul Ritter, Dearborn, MI (US); Jeffery Scott Hawkins, Farmington Hills, MI (US); James Edward Zuccaro, Algonac, MI (US); Victor James Meloche, Westland, MI (US); Karen Elizabeth Weber, South Lyon, MI (US)

(73) Assignee: Detroit Diesel Corporation, Detroit, MI (US)

( * ) Notice: Subject to any disclaimer, the term of this patent is extended or adjusted under 35 U.S.C. 154(b) by 78 days.

(21) Appl. No.: 10/392,551

(22) Filed: Mar. 20, 2003

(65) Prior Publication Data

US 2004/0186657 A1 Sep. 23, 2004

(51) Int. Cl.[7] ................................................ G60G 7/70
(52) U.S. Cl. ........................... 701/114; 701/101; 701/1; 701/29; 701/35; 701/115; 73/116; 73/117.3
(58) Field of Search ............................... 701/1, 29, 35, 701/101–106, 114, 115; 73/116, 117.3

(56) References Cited

U.S. PATENT DOCUMENTS

| | | | |
|---|---|---|---|
| 5,440,479 A | 8/1995 | Hutton ....................... 364/401 |
| 5,493,490 A | 2/1996 | Johnson ....................... 364/401 |
| 6,041,310 A | 3/2000 | Green et al. .................. 705/27 |
| 6,169,989 B1 | 1/2001 | Eichstaedt et al. .......... 707/100 |
| 6,223,094 B1 | 4/2001 | Muehleck et al. .......... 700/107 |
| 6,405,111 B2 * | 6/2002 | Rogers et al. ................ 701/33 |
| 6,487,717 B1 * | 11/2002 | Brunemann et al. ........ 717/173 |
| 6,505,194 B1 * | 1/2003 | Nikolovska et al. ........... 707/3 |
| 6,512,974 B2 * | 1/2003 | Houston et al. ............ 701/115 |
| 6,539,299 B2 * | 3/2003 | Chatfield et al. ........... 701/104 |
| 6,588,210 B2 * | 7/2003 | Kreso .......................... 60/602 |
| 6,636,790 B1 * | 10/2003 | Lightner et al. .............. 701/33 |
| 6,768,941 B2 * | 7/2004 | Sasena et al. ............... 701/114 |
| 2003/0004745 A1 | 1/2003 | Takakura et al. .............. 705/1 |

* cited by examiner

Primary Examiner—Tony M. Argenbright
Assistant Examiner—Johnny H. Hoang
(74) Attorney, Agent, or Firm—Brooks Kushman P.C.

(57) ABSTRACT

A method of determining an engine controller module (ECM) parameter set, the method includes specifying at least one criteria, determining whether at least one existing parameter set matches the specified criteria, presenting a report that indicates at least one matching parameter set when there is at least one matching parameter set, and presenting an alert when there is no matching parameter set, wherein the method is implemented via an ECM vendor extranet on a World Wide Web server.

20 Claims, 10 Drawing Sheets

Instructions:
Select the options and criteria you want from the list, then click the "Submit" button at the bottom of the list.

NOTE: Selecting multiple options narrows your search. If you select multiple options, the wizard will find all groups that match all of your requirements

| | |
|---|---|
| ☐ | Pulse Width Modulated Output 3<br>Name - PWM3 E-W2-910 |
| ☐ | Pulse Width Modulated Output 4<br>Name - PWM4 E-X2-911 |
| ☐ | Variable Speed Governing (VSG) Using An Electronic Foot Pedal<br>Name - VSG Using Foot Pedal |
| ☐ | Variable Speed Governing (VSG) Using Cruise Control<br>Name - Cruise Control VSG |
| ☐ | Variable Speed Governor Configured As Primary Throttle Control<br>Name - VSG is Primary |
| ☑ | Vehicle Speed Sensor (VSS) Enabled for Cruise Control, Vehicle Speed Limiting, and Cruise Control VSG<br>Name - Vehicle Speed Sensor |

Reset    Submit

SALES INFORMATION | TECHNICAL DATA & CURVES | DRAWINGS | INSTALLATION GUIDELINES | HOME PAGE

Fig. 2b

| | | Application — 204 | | ECM Selection |
| | | Engine Series — 206 | | Parameters |
| --- | --- | --- | --- | --- |
| | | For use in Crane Applications. Includes: Limiting Speed Governing (LSG), Variable-Speed Governing (VSG) using a Foot Pedal, Jake Brakes, Engine Overtemperature Protection (EOP), Cruise Control, & Vehicle Speed Sensor (VSS). | | |

214a — 214b

| | | | | |
| --- | --- | --- | --- | --- |
| PWM Trans | 00 | VSG Max RPM | 0 | Hot Idle | BASE |
| VSG Cruise Switch | YES | VSG Min RPM | 700 | Cold Idle | BASE |
| Init Speed | 1000 | VSG Alt Min RPM | 0 | Max Droop | BASE |
| RPM Increment | 25 | VSG is Primary | 0 | LSG Droop | 125 |
| | | | | VSG Droop | 0 |
| IDLE SHUTDOWN | YES | Time | 5MIN | | |
| | | Operates on | IDLE VSG GOVERNOR | | |
| Maximum Security | NO | Override | NO | | |
| Minimum Security | NO | Min Temp | 75DEG C | Max Temp | 75DEG C |
| ENGINE PROTECTION | | Digital Fan | SINGLE | FUEL ECONOMY INCENTIVE | |
| Coolant Temp | SHUTDOWN | PWM Fan | NONE | Min MPG | 7 |
| Coolant Level | SHUTDOWN | Dynamic Brk | NO | Max MPH | 0 |
| Coolant Pressure | SHUTDOWN | | | Conv. Factor | 6 |
| R1 Coolant Pressure | DISABLED | Engine Brakes | JAKE | Calc. Type | 0 |
| Crankcase Pressure | YES | Eng Brake Cruise | NO | | |
| Override | DISABLED | Eng Brake Low | 3 | | |
| Intercool Temp | WARNING | Increment | 2 | | |
| Oil Pressure | | | | | |
| Override | YES | Data Pages | See 06N05 Group | | |
| Oil Temp | SHUTDOWN | Optimized Idle | See 06N05 Group | | |
| R1 Oil Temp | | Fan Timer | 180 | | |
| Aux Stop 1 | SHUTDOWN | | | | |
| Aux Stop 2 | SHUTDOWN | Full Power Override | NO | | |
| Vehicle Speed Sensor | YES | Cruise Control | YES | Press Gov System | NO |
| VSS Sensor Type | TRANS | Auto Resume | NO | Cavitation Timeout | |
| VSS Signal Type | OPEN COL | Min Speed | 20 | Pump Pressure Incr | |
| Num Teeth | 16 | Max Speed | 60 | Eng Spd Incr | |
| Tire Rev/Mile | 500 | | | Integral Gain | |
| Axle Ratio | 3.55 | ATI Port | NONE | Prop Gain | |
| Final Gear Ratio | 1 | | | | |
| Vehicle Speed limit | YES | Digital Torque Curve | 1 | | |
| Max Speed | 60 | Starter Lockout Enable Speed | 500 | | |
| Overspeed with Fuel | 0 | Starter Lockout Disable Speed | 60 | | |
| Overspeed w/o Fuel | 0 | | | | |

Inquires should be sent to: Vendor Representative — 404

Printed On: DATE — 406 The user is advised to check the extranet databases for latest information. 410 — UNCONTROLLED COPY Date Last Updated: UP_DATE Page 1 of 3 — 408

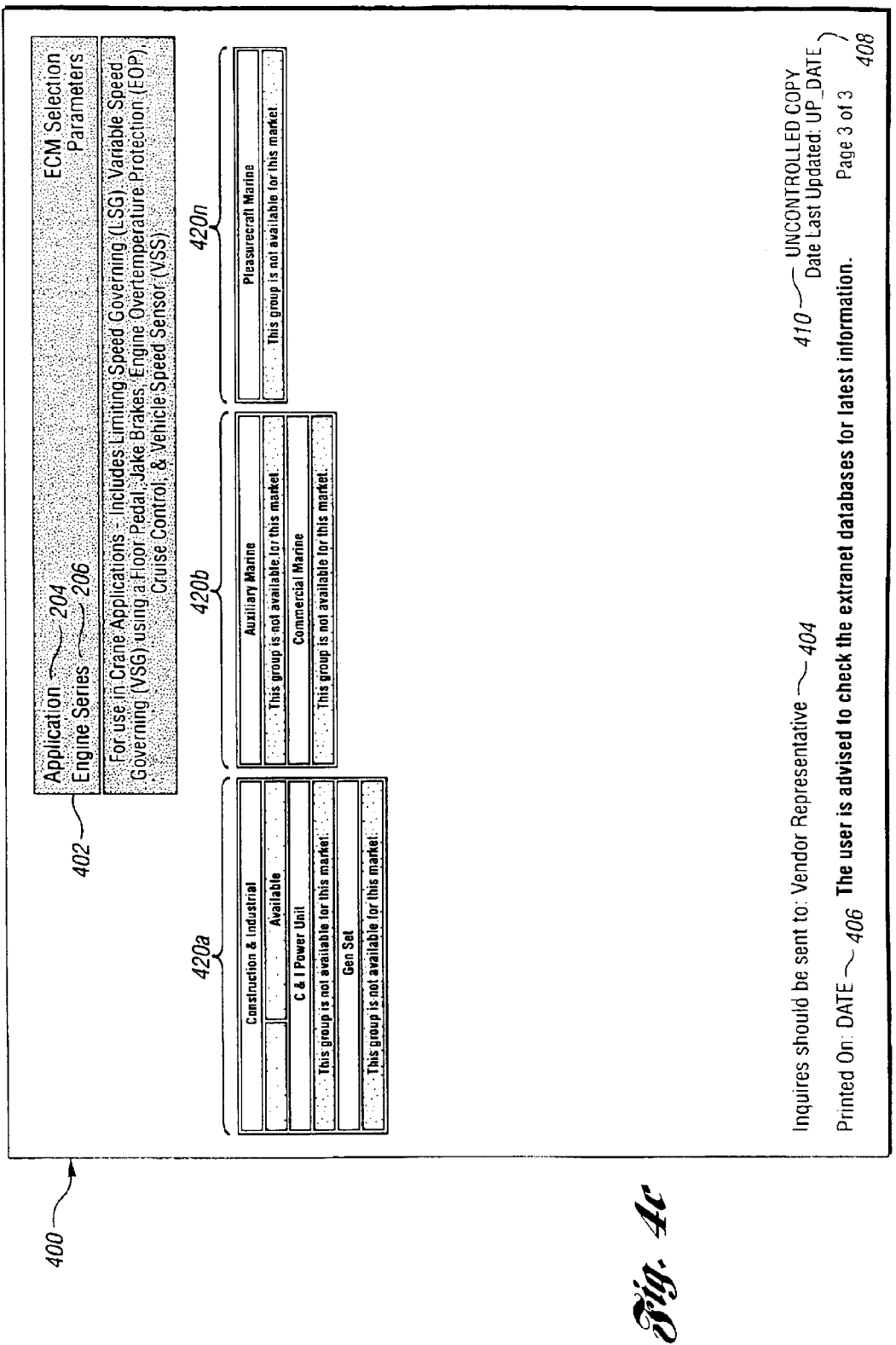

SYSTEM AND METHOD FOR DETERMINING A PARAMETER SET FOR AN ENGINE CONTROLLER MODULE

BACKGROUND OF THE INVENTION

1. Field of the Invention

The present invention relates to a system and a method for determining (or specifying) feature based programming for an engine controller module.

2. Background Art

Internal combustion engines, and in particular, compression ignition (or diesel) engines have a wide variety of applications including passenger vehicles, marine vessels, earth-moving and construction equipment, stationary generators, and on-highway trucks, among others. Electronic engine control (or controller) modules (ECMs) (or powertrain control modules, PCMs) having feature based programming (i.e., parameter sets) provide a wide range of flexibility in tailoring engine performance to a particular application (e.g., installation, market, etc.) without significant changes to engine hardware. For example, engines having similar hardware may be running a generator to cool a refrigerated truck, driving a pump on a fire engine, powering hydraulics for a crane or construction equipment, powering on-highway trucks, etc. and may depend on a particular parameter set to be implemented to meet the design criteria of the particular application. The ECM typically reads the engine and vehicle (or system where the engine is installed) inputs, sensors and switches, determines (e.g., calculates) injector firing and duration, and fires injectors at appropriate times.

Engines and/or ECMs that are configured to control the respective engines are typically manufactured, sold, serviced (or maintained), leased, rented, etc. by a vendor. The vendor generally sells the engines and ECMs having manually specified parameter sets, and interfaces with the customers (or end users) through distributors and dealers although some direct customer sales and service are performed.

In many typical conventional systems and methods of determining the ECM parameter set that is implemented in a particular application, the user configuring the engine either selects a parameter set based on prior experience or, alternatively, relies on the engineering descriptions in an ECM vendor business system, or contacts vendor customer service support personnel for assistance. Some conventional selection systems provide the customer flexibility through selectable parameters using a manual selection system or process. A worksheet is typically generated to guide the user through the parameters that can be specified corresponding to the respective group. That worksheet is then submitted to the ECM vendor customer service support personnel such as a Sales Engineering Group and an Application Engineering Group to determine what is believed to be the best parameter set to fit the needs of the customer. The customer may have to interface with (e.g., search, enter user information, choose parameters, etc.) three or possibly more vendor business systems to determine which ECM or group of ECMs is appropriate to meet the design criteria of a particular application.

There typically are different levels of parameter modification which can further complicate the manual selection system. Some of the parameters can be changed by a customer using handheld service tools or by using a computer. An ECM vendor distributor can change some of the parameters using a reprogramming station (or computer system), and the vendor Technical Service can change other parameters. The vendor Application Engineering generally controls some of the parameters (i.e., some of the ECM parameters can not be modified by the user, distributor or dealer).

Thus, there can be many parameter sets available from the vendor that can meet the design criteria of a variety of particular applications. For example, there are parameter set groups available specifically for on-highway trucks, cranes, air compressors, aircraft jet starters, underground mining equipment, buses, and so on. Unfortunately, even with parameter set groups available for specific applications, many times a customer is only offered the most common of the parameter sets. The considerable flexibility in customer applications can generate a proliferation of parameter sets available for specific applications. Configuring a parameter set while attempting to interpret the differences between the parameter set groups without the assistance of the vendor Application Engineering personnel can be a very difficult task for the customer, dealer, or distributor.

As such, conventional systems and methods of determining the appropriate ECM parameter set (or group of parameter sets) to meet customer requirements for a particular application are substantially manual tasks with several instances of human intervention that can be time consuming, frustrating, expensive for an ECM vendor to provide, and can result in an improper choice of parameter set.

Thus, there exists a need for an improved system and method for determining an engine controller module (ECM) parameter set. In one example, the improved system and method for determining an engine controller module parameter set of the present invention may assist dealers, distributors and customers with the selection of appropriate parameter sets to find the closest match based on customer identified (or specified) criteria, thus saving time, reducing the likelihood of improper selection, improving customer satisfaction, and reducing or eliminating reprogramming. Such an improved system and method may provide the user a single interface (e.g., an extranet site) that performs the tasks of three different business systems (e.g., systems that provide user information, searches, determination of controller group, parameter selection, etc.). The improved system and method of the present invention may be used by a vendor representative to assist ECM distributors and customers to determine appropriate parameter sets, manage existing parameter set groups, eliminate duplication of parameter set groups, and facilitate the release (i.e., implementation) of new parameter sets.

SUMMARY OF THE INVENTION

The present invention generally provides new, improved and innovative techniques to determining (or specifying) an engine controller module (ECM) feature based programming parameter set. The improved system and method for determining a parameter set of the present invention may assist distributors and customers with the selection of appropriate parameter sets to find the closest match, thus saving time, reducing the likelihood of improper parameter set selection, improving customer satisfaction, and reducing or eliminating reprogramming. Such an improved system and method may provide a single interface (e.g., an extranet Web site) that performs the tasks of three different business systems (e.g., user information, searches, determination of controller group, parameter selection, etc.). The improved system and method of the present invention may be used by a vendor representative to assist ECM distributors and customers to select appropriate parameter sets, manage existing parameter sets, eliminate duplication of parameter sets, and facilitate the release and implementation of new parameter sets.

According to the present invention, a method for determining an engine controller module (ECM) parameter set is provided. The method comprising specifying at least one criteria using at least one access device, determining whether at least one existing parameter set matches the specified criteria, presenting a report that indicates at least one matching parameter set when there is at least one matching parameter set, and presenting an alert when there is no matching parameter set, wherein the method is implemented via an ECM vendor extranet on a World Wide Web server.

Also according to the present invention, a method of determining engine controller module (ECM) parameter set availability is provided. The method comprising specifying at least one parameter set using at least one access device, determining at least one existing parameter set that matches the at least one specified parameter set, and presenting a report that indicates at least one application and at least one release date corresponding to the matching parameter set, wherein the method is implemented via an ECM vendor extranet on a World Wide Web server.

Further, according to the present invention, a computer system for selecting an engine controller module (ECM) parameter set is provided. The system comprising at least one access device for specifying at least one criteria, at least one database for storing at least one existing parameter set, and an extranet server for matching the at least one specified criteria to the at least one existing parameter set.

The above features, and other features and advantages of the present invention are readily apparent from the following detailed descriptions thereof when taken in connection with the accompanying drawings.

BRIEF DESCRIPTION OF THE DRAWINGS

FIGS. 4(a–c) are diagrams of other screen images in accordance with the present invention;

DETAILED DESCRIPTION OF THE PREFERRED EMBODIMENT(S)

Figure 1:
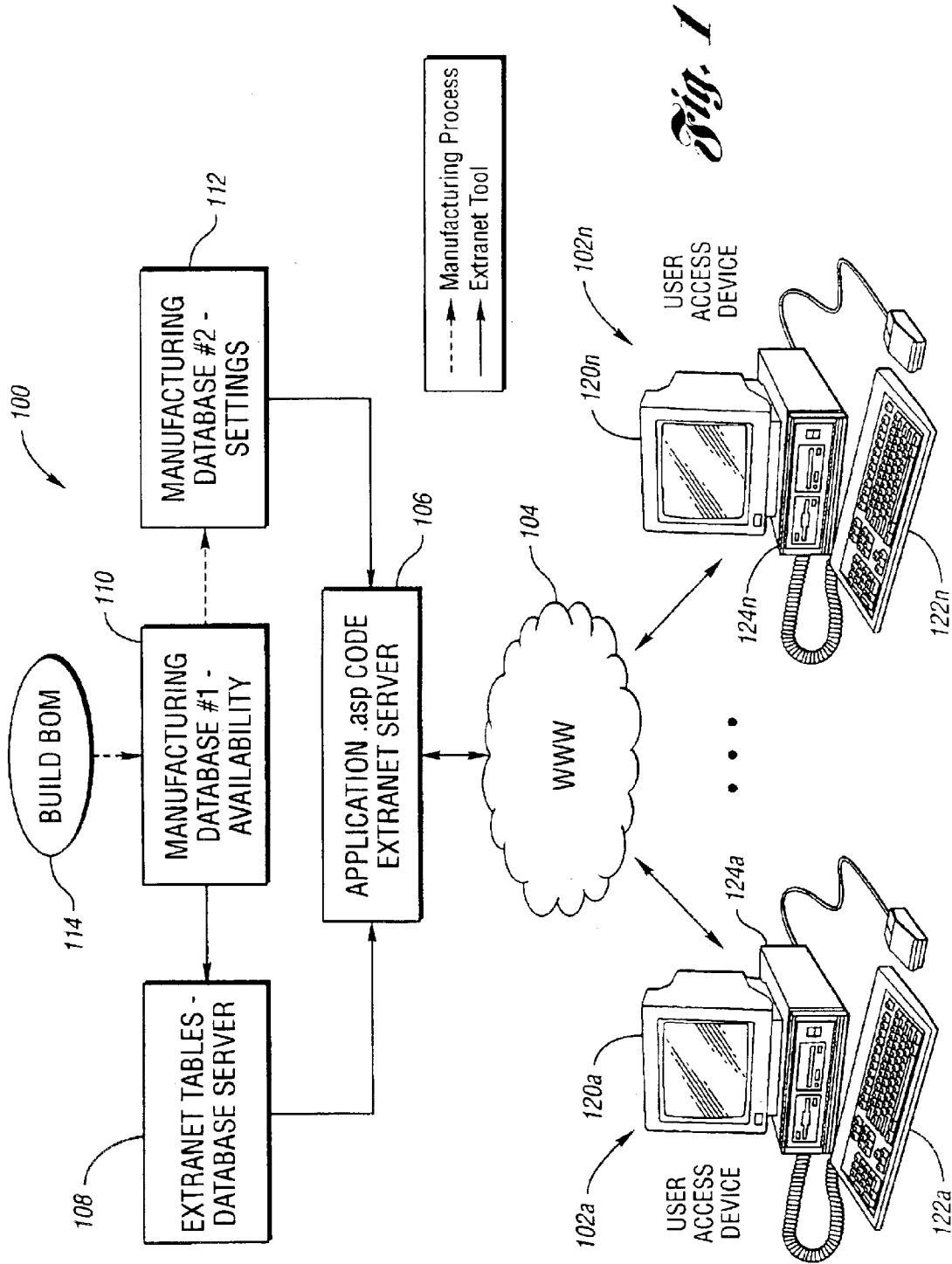
FIG. 1 is a diagram of an engine controller parameter set selection system in accordance with the present invention.

With reference to the Figures, the preferred embodiments of the present invention will how be described in detail. Generally, the present invention provides an improved system and method for determining (or specifying) engine control (or controller) modules (ECMs) or powertrain controller modules (PCMs) parameter sets (i.e., feature based programming). In one example, the present invention may determine a group (e.g., family, set, etc.) of ECM parameter sets that meet the design criteria of a particular application (e.g., installation, market, customer usage, etc.).

In another example, the present invention may determine a single parameter set that meets the design criteria of a particular application. In yet another example, the present invention may determine that no existing (or available) parameter sets meet the design criteria of the particular application and an alert is generally presented. The present invention may improve the selection process of at least one parameter set in response to the ECM application and customer (or user) selectable parameter sets. The present invention may be implemented via an ECM vendor extranet through a user operated computer menu (e.g., at least one screen image that implements drop-down selections).

In one mode of operation, after the selection of an engine application and an engine (or series of engine products) a computer menu link through the extranet may bring up (i.e., access, display, etc.) at least one page of programable features that can be selected as on or off, or selected as at least one value from a drop-down list. When the user has selected desired features and submitted a request to determine the respective parameter set, a list of all of the parameter sets matching the request may be determined and displayed. User selection of an ECM parameter set may bring up at least one respective page in a Verification Report (i.e., usage confirmation) format. The Verification Report format listing may provide default parameter values for the respective parameter set.

Alternatively, in another mode of operation, after the selection of an engine application and an engine ECM drawings and option information may be selected from a menu, and the vendor product group listings to particular parameter sets may be determined. The user may be able to click on (or otherwise select) an appropriate link, which may generate a display of option information containing an availability table of all of the parameter sets released to the respective models for the application and engine series previously selected may be determined. When the specific appropriate parameter set link is selected, the default values for the respective parameter set may again be displayed to the user in the Verification Report format.

Engines and/or ECMs that are configured to control the respective engines are typically manufactured, sold, serviced (or maintained), leased, rented, etc. by a vendor using the ECM parameter set. The vendor generally sells the engines and ECMs having manually specified parameter sets, and interfaces with the customers (or end users) through distributors and dealers although some direct customer sales and service are performed.

There typically are different levels of ECM parameter modification which can further complicate the manual parameter set selection system. Some of the ECM parameter sets can be changed by a customer using handheld service tools or by using a computer. An ECM vendor distributor can change some of the parameter sets using a reprogramming station (or computer system), and the vendor Technical Service can change other parameters. The vendor Application Engineering generally controls some of the parameters (i.e., some of the ECM parameters can not be modified by the user, distributor or dealer).

Thus, there can be many parameter sets available from the vendor that can meet the design criteria of a variety of particular applications. For example, there are parameter sets available specifically for on-highway trucks, cranes, air compressors, aircraft jet starters, underground mining equipment, buses, and so on. Unfortunately, even with parameter sets available for specific applications, many times a customer is only offered the most common of the parameter sets. The considerable flexibility in customer applications can generate a proliferation of parameter sets available for specific applications. Configuring a parameter set while attempting to interpret the differences between the parameter sets without the assistance of the vendor Application Engineering personnel can be a very difficult task for the customer, dealer, or distributor.

The improved system and method for determining an appropriate engine controller module parameter set (i.e., feature based programming) of the present invention may assist dealers, distributors and customers with the selection of appropriate parameter sets to find the closest match, thus saving time, reducing the likelihood of improper parameter set selection, improving customer satisfaction, and reducing or eliminating reprogramming. Such an improved system and method may provide the user a single interface (e.g., an extranet site) that performs the tasks of three different business systems (e.g., systems that provide user information, searches, determination of controller group, parameter selection, etc.). The improved system and method of the present invention may be used by a vendor representative to assist ECM distributors and customers to determine appropriate parameter sets, manage existing parameter sets, eliminate duplication of parameter sets, and facilitate the release (i.e., implementation) of new parameter sets.

The present invention is generally implemented as an on-line, Web-based (e.g., an extranet implementation), automated business solution that may determine customer selectable engine and/or ECM parameter (e.g., criteria, option, etc.) sets to be implemented in connection with an ECM for any given engine or powertrain product. The present invention may determine which customer selectable parameter sets are available by reading information stored on at least one manufacturing server database. The present invention may implement pop-up help windows with technical descriptions of each customer selectable parameter set.

The present invention may perform at least one search of customer selected parameter sets to determine (e.g., identify, generate, etc.) at least one existing (or available) parameter set that may match customer requested (or selected) criteria based on a particular product and application. A search engine implemented in connection with the present invention is generally unrestricted as to the number of parameter sets and respective settings (e.g., on, off, enabled, disabled, etc.) that the user may request. Therefore, the user may select no parameter sets, one parameter set, or multiple parameter sets. The present invention may determine an exact, close, or no matching parameter set.

When the search engine provides a close match or no matching parameter set to the user criteria, the present invention may facilitate a request for a new customer selectable parameter set. A closely matching parameter set may minimize or eliminate the need for customer reprogramming. The search results for parameter sets that match particular application and product parameters are generally grouped (or segregated) by availability category (e.g., obsolete, current, and future parameter set availability) and may be viewed on a display screen or saved and/or printed in at least one standard format. In other example modes of operation, the improved method and system of the present invention may allow the customer to not specify particular criteria, or a particular parameter set for a given engine and application and thus, determine all appropriate parameter sets.

The present invention may improve the selection process of application and customer selectable parameters. The present invention is generally available on the vendor extranet as an addition to at least one existing extranet application. A user having access to the vendor extranet may have access to the system and method for determining at least one parameter set of the present invention. The present invention may be configured such that a user may select a desired market (e.g., application, usage, installation, etc.) and engine (or engine series) using at least one drop-down menu. Menu choices may include a "Drawings and Option Information" menu (or icons) related to at least one parameter set. The user may select at least one program (or routine) for determining at least one existing parameter set that matches (or is close to matching) the desired market and engine parameters.

The ECM parameter set determining process may be implemented as an application that allows customers to determine the proper parameter set configuration for the respective engine by specifying the functions the engine must perform (or must not perform). The present invention generally provides parameter selections that are written in business language that a typical customer (or user) can understand. In addition to the corresponding parameter name, the present invention generally provides choices to the customer for the selection of an engine configuration without the need for intervention of vendor sales or engineering personnel.

Referring to FIG. 1, a diagram illustrating an ECM (or PCM) parameter set selection system 100 in accordance with a preferred embodiment of the present invention is shown. The system 100 is generally implemented to determine at least one parameter set (not shown) that is generally implemented in connection with a diesel (or compression ignition) engine (not shown). However, the system 100 may be implemented in connection with determining any appropriate engine (e.g., Otto cycle, Rankine cycle, Miller cycle, etc.) ECM (or PCM) parameter set to meet the design criteria of a particular application. The ECM and engine are generally supplied by a particular vendor. However, the ECM and the engine may be supplied by different vendors. The system 100 generally comprises at least one user access device 102 (e.g., access devices 102a–102n), World Wide Web (WWW) 104, an extranet application code server 106, an extranet server and at least one database (or tables) 108, an availability database 110, a settings database 112, and a build database (or Bill Of Materials, BOM) 114.

Each device 102 generally comprises a display (e.g., a visual display such as a monitor, screen, etc.) or other feedback/output device (e.g., an audible device such as a speaker) 120, a user entry (or input) device (e.g., keyboard, keypad, mouse, trackball, touchscreen, microphone, etc.) 122, and an interface/computing device (e.g., computer, processor, microprocessor, etc.) 124. The user device 102 is generally implemented as at least one computer system for accessing the WWW 104. The device 102 may be implemented as a wired or wireless access device. However, the device 102 may be implemented as any appropriate WWW 104 access device (e.g., a dedicated WWW access device, a personal digital assistant having appropriate software and communication hardware, etc.) to meet the design criteria of a particular application.

The WWW 104 is generally the World Wide Web comprising a set (or collection) of text, sound, animation, and/or graphics documents residing on Internet servers (such as the servers 106 and 108) that implement Hyper Text Transfer Protocol (HTTP) and are accessible to at least one user (not shown) via the device 102. The Internet (or Cyberspace) generally comprises an interconnected system of computer networks that use Transmission Control Protocol/Internet Protocol (TCP/IP) network protocols to facilitate data transmission and exchange, and connect computers (i.e., servers, access devices, etc.) around the world. As such, the system 100 may be accessed by a user having an appropriate access device 102 substantially anywhere throughout the world.

The server 106 is generally in communication with (i.e., coupled to, connected to, linked to, etc.) the WWW 104, the server 108, and the database 112. The server 106 may comprise an application (e.g., programming, at least one routine, etc.) that may define (e.g., correspond to, relate to, generate, determine, etc.) at least one existing (or available) ECM parameter set that relates to the desired functionality and respective electronic parameters as indicated (e.g., input, entered, selected, etc.) by the user, and present the matching parameter set to the user. The server 106 may also generate a message (e.g., an alert) that is presented (or communicated) to the user when no appropriate parameter set match is found. The alert may prompt the user to request the engine/ECM vendor to implement a new parameter set to meet the unmatched parameter set design criteria. The servers 106 and 108 may be implemented in connection with at least one intranet or at least one extranet implemented by the ECM vendor.

In one example, the server 106 application may comprise at least one worksheet implemented via. asp (i.e., application service provider) code. However, the server 106 may implement the respective parameter set selection application using any appropriate code to meet the design criteria of a particular application. The functionality and parameters that the user enters in the worksheet may include type of powertrain (i.e., type of engine and type of transmission), engine speed governing (i.e., idle speed, high idle speed, droop, cruise control variables, etc.), engine protection strategy, digital and analog inputs, digital and analog outputs, fan controls, throttle controls, and the like. However, the parameter set selection application worksheet may include any appropriate parameters to meet the design criteria of a particular application.

The server 106 application generally defines defaults and validation ranges for the programmable features. The server 106 application may be configured to generate a list of parameter sets (i.e., at least one parameter set) that match (i.e., in response to, relate to, correspond to, etc.) at least one user selected engine and/or installation (or application) parameter set. The server 106 application generally provides the application engineering personnel, product engineering personnel, ECM engineering personnel, distributors, dealers, and end users with flexibility to customize engine speed governing and control, engine protection, communications (i.e., inputs and outputs), and the like.

The servers 106 and 108 are generally implemented (or reside) in an extranet that is generated and maintained by the ECM vendor. The extranet is generally implemented as an extension of a vendor intranet over the World Wide Web, that enables communication between the vendor and users by providing limited access to the vendor intranet. The extranet access is generally limited (e.g., via at least one of a firewall, user identification, user password, etc.) to selected users (e.g., selected customers, distributors, service centers, dealers, etc.) in contrast to a vendor public Website which is generally accessible to most interested parties. The vendor intranet generally comprises a privately maintained computer network which provides services (e.g., e-mail, data transfer, etc.) within the vendor organization similar to the services provided by the Internet. The vendor intranet is generally only accessible by users within the vendor organization.

The at least one table (or database) within the server 108 generally comprises a variety of databases related to parameter sets, ECMs, and/or engines that are manufactured, sold, serviced (or maintained), leased, rented, etc. by the vendor. The server 108 is generally coupled to the at least one manufacturing database 110 that may be configured to provide information (or data) related to ECM, and ECM feature or parameter availability databases. The database 110 is generally in communication with the manufacturing settings database 112 and the BOM 114.

The links between the user device 102 and the WWW 104, the WWW 104 and the server 106, the server 106 and the server 108, the server 108 and the database 110, and the server 106 and the database 112 are generally implemented as tools (or connections, coupling, links, etc.) in connection with the vendor extranet. The links between the availability database 110 and the settings database 112, and the availability database 110 and the build BOM 114 are generally implemented in connection with at least one manufacturing process related communication (i.e., link, interconnection, etc.).

Figure 2A:
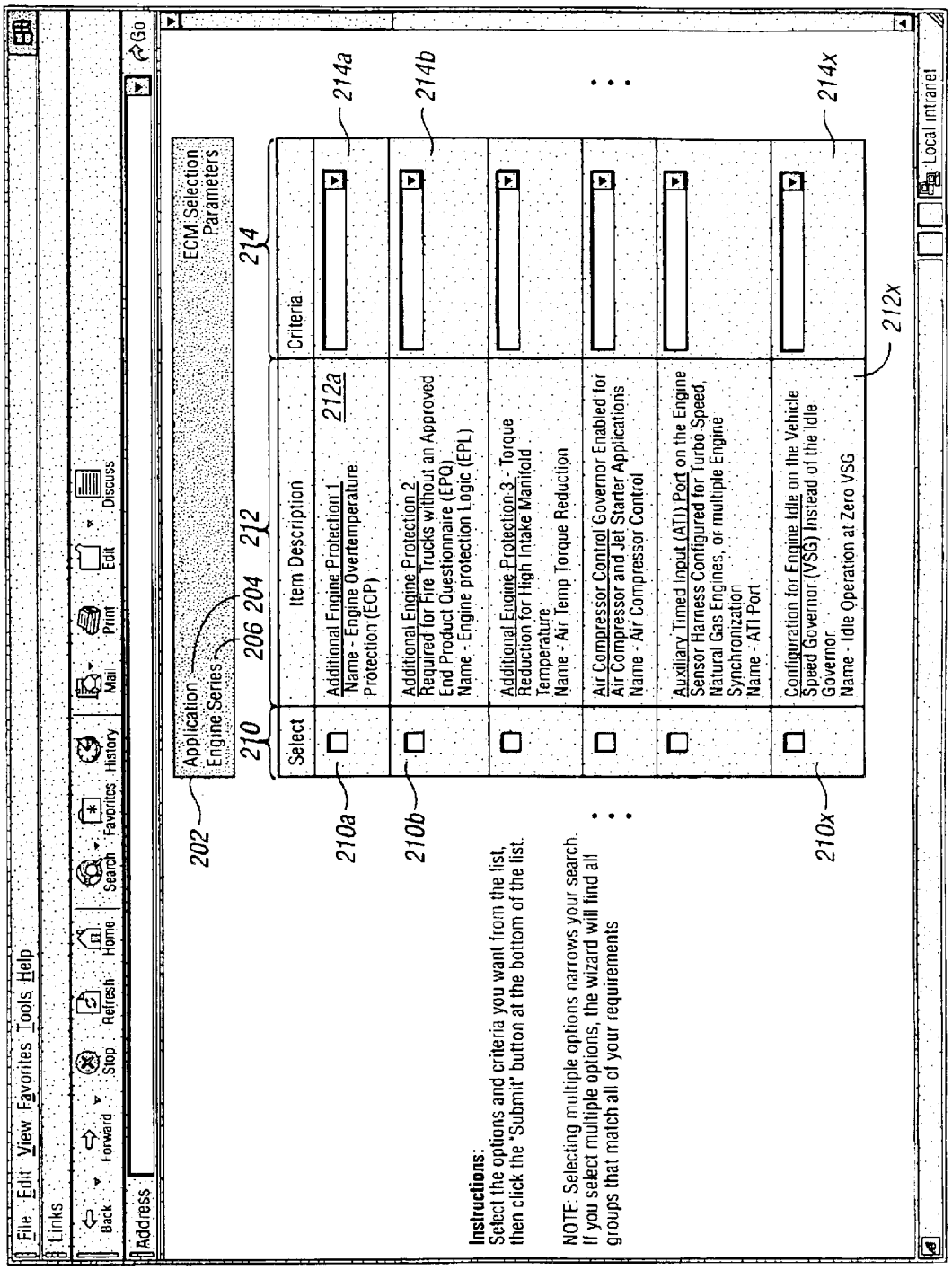
FIGS. 2(a–c) are diagrams of screen images in accordance with the present invention.

Referring to FIGS. 2(*a–c*) diagrams illustrating at least one screen image (e.g., screen shots, frames, depictions, etc.) 200 that is generally displayed (i.e., shown, projected, reproduced, presented, etc.) on the display 120 during at least one portion of parameter set selection in accordance with a preferred embodiment of the present invention. At least one selection application (i.e., programming, routine, etc.) (e.g., the program that corresponds to the image 200) is generally available on the vendor extranet that is implemented in connection with the servers 106 and 108. While the images related to the present invention are generally shown in connection with a standard computer operating system and Web browser, any appropriate computer operating system and Web browser may be implemented to meet the design criteria of a particular application.

Referring, in particular, to FIGS. 2(*a–b*), screen image 200 of the selection (or identification) parameters (i.e., criteria and settings) is illustrated. A user (or customer) having access to the vendor extranet generally selects (i.e., identifies, chooses, etc.) a market/application 204 and engine series 206 from drop-down menus. The market/application 204 and engine series 206 generally appear in a title block 202. Menu choices that are presented to the user in the extranet generally include at least one menu selection that will link the user to the parameter set selection program that corresponds to the screen 200.

The application 204 may comprise such markets (or installations) as passenger vehicles, marine vessels, earthmoving and construction equipment, stationary generators, and on-highway trucks, running a generator to cool a refrigerated truck, driving a pump on a fire engine, powering hydraulics for a crane or construction equipment, powering on-highway trucks, etc. The engine series 206 may comprise engines that are related to criteria such as type of powertrain (i.e., type of engine and type of transmission), engine displacement, torque and horsepower characteristics, etc.

The selection routine is generally implemented as an application (i.e., program, routine, etc.) that allows customers to determine the proper parameter set for their engine by specifying the functions the engine must perform (or must not perform). The present invention generally provides parameter selections that are written in business language that a typical customer (or user) can understand. Alternatively, the customer may be provided with a report listing all of the parameter set that are appropriate the engine and application when the user does not specify criteria. The present invention generally provides, as well as the corresponding parameter name, choices to provide the customer selection of an engine configuration without the intervention of Sales or Engineering personnel.

The screen 200 is generally configured as a worksheet that has a drop-down selection column (or segment) 210 having selection icons 210a–210n that correspond to the engine and parameters (i.e., user selectable criteria and settings), a drop-down description column (or segment) 212 having description blocks 212a–212n that briefly describe the respective engine configuration parameters, and a drop-down criteria column (or segment) 214 having parameter blocks 214a–214n that briefly describe the respective available parameter values or choices that the user may select or enter (i.e., customer specified criteria). The functionality and parameters that the user enters in the worksheet 200 may include engine speed governing (i.e., idle speed, high idle speed, droop, cruise control variables, etc.), engine protection strategy, digital and analog inputs, digital and analog outputs, fan controls, throttle controls, and the like.

Figure 2C:
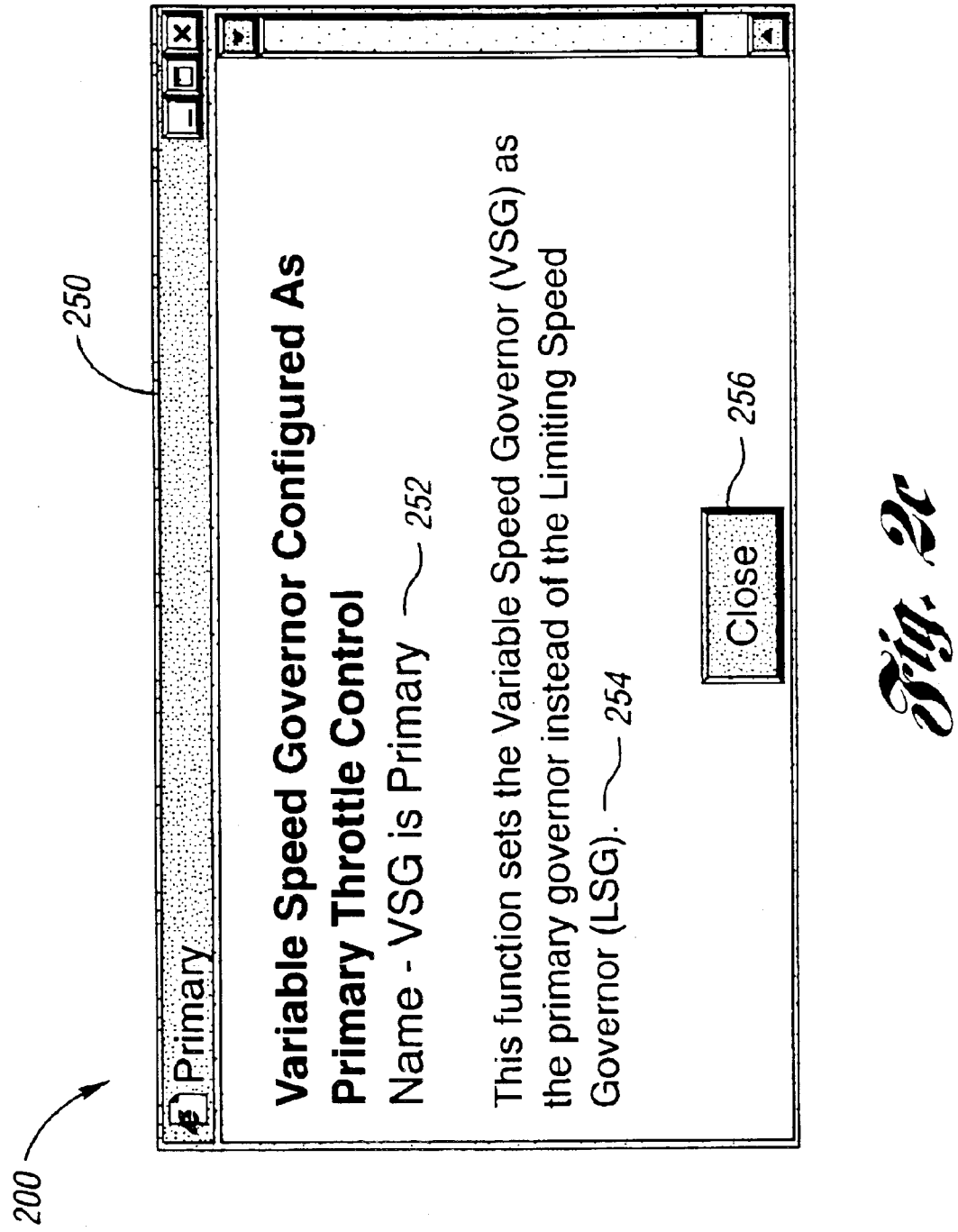

Referring, in particular, to FIG. 2c, when the user clicks on (or otherwise indicates selection of) a respective hyperlink for each item 212, a pop-up help window 250 having a more detailed title 252 and a more detailed description 254 of the feature (i.e., criteria, parameter, etc.) may be displayed. The user may return to the selection parameters screen 200 by selecting a "close" icon 256.

Referring, in particular, to FIG. 2b, when the user determines that a different set of parameters should be entered (i.e., the customer wishes to specify a different set of criteria), a "reset" icon 220a may be selected. When the desired engine parameters (or features) are selected (i.e., the customer criteria are specified) as on or off, or a value is chosen from a drop down list, a "submit" icon (or button) 220n at the bottom of the list 200 may be selected (or clicked). When the user clicks the submit button 220n, a request is generally sent (i.e., presented, communicated, etc.) to the Web server 106. The Web server 108 is generally connected (or coupled) to the vendor database 110, which is coupled to the database 114. The database 114 generally contains the complete Bill of Material (BOM) 114 for each engine series and model that the vendor produces.

The WWW extranet server 108 generally manages a selection program that may evaluate the engine series and application selected (or specified) by the user and formulate (e.g., determine, select, etc.) an appropriate database query (e.g., a query to at least one of the databases 110, 112 and 114). The screen 200 may also be implemented having a number of icons 230 (e.g., icons 230a–230n). When selected by the user, the icons 230 may link the user to information such as sales, technical data, engine (or powertrain) performance data and curves, engine (or powertrain) installation guidelines, the extranet homepage, and the like. The information linked via the icon 230 may be stored in at least one of the databases 108, 110, 112, and 114 or any other appropriate database.

Each feature 212 that was selected by the user on the screen 200 page may be translated into query specifications for the parameter set selection program. The BOM 114 records that match all criteria for the selected engine series 206 and application 204 may be returned and displayed as search results to the user on the display 120.

Figure 3:
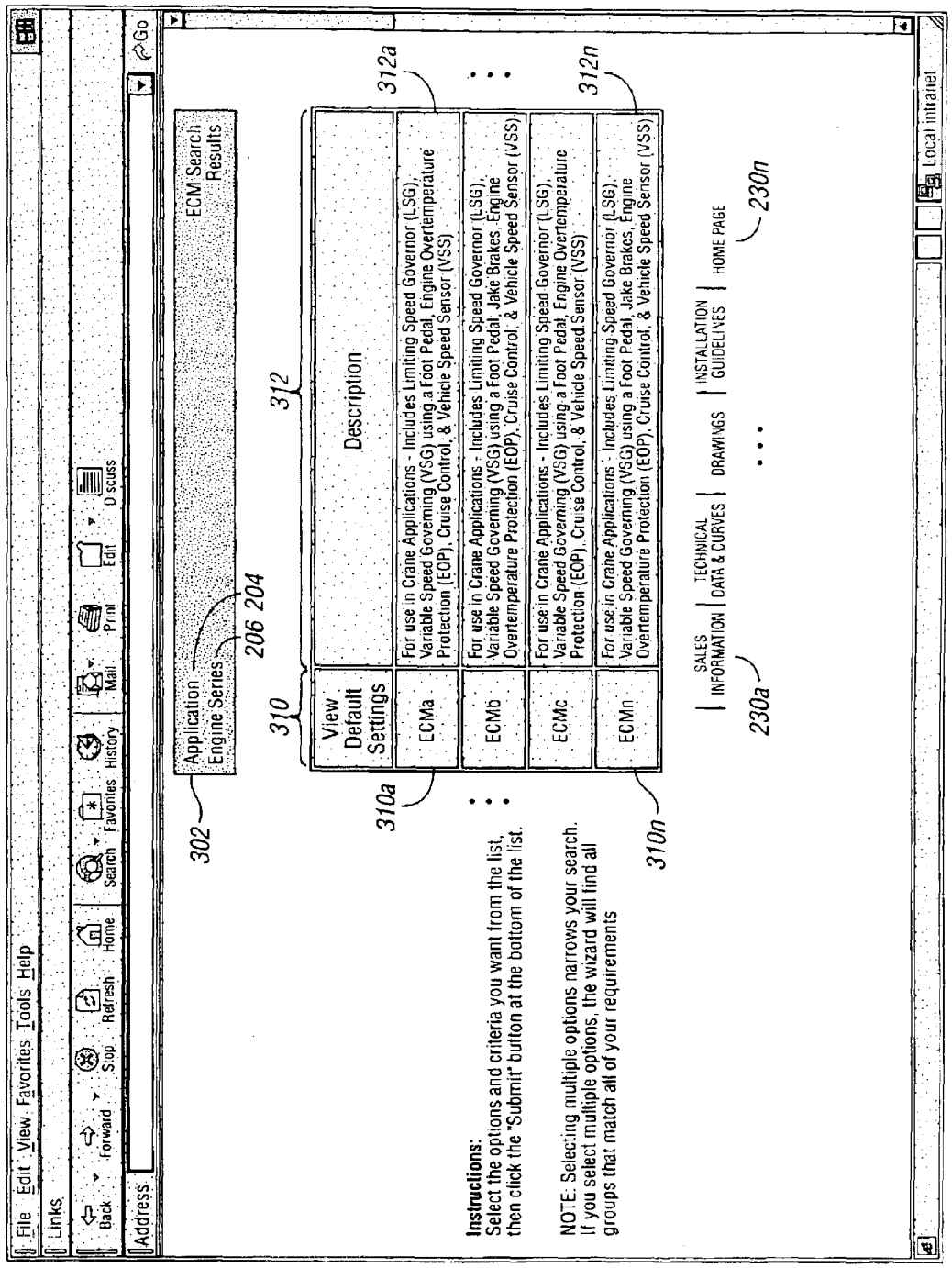
FIG. 3 is a diagram of another screen image in accordance with the present invention.

Referring to FIG. 3, a screen image 300 illustrating search results in accordance with a preferred embodiment of the present invention is shown. The parameter set selection program that generally resides in the Web extranet server 108 may generate a list of all of the parameter sets that match the request (i.e., the selected, specified, chosen, picked, desired, etc.) criteria (e.g., the parameters 212). Matching parameter sets generally includes parameter sets such that the respective ECM controls the respective engine in the respective application to meet or exceed the specified criteria. The search results screen 300 generally includes a title block 302 that includes the application 204 and the engine series 206, and the icons 230. The search results 300 generally include a parameter set list 310 of ECMs (e.g., ECMs 310a–310n indicated by respective identifiers ECMa–ECMn) that match the parameter set search criteria, and a list 312 of respective parameter set descriptions (e.g., descriptions 312a–312n) of the ECMs. Selection of a particular parameter set 310 may link the user to a description or list of the respective parameter set default value settings (e.g., settings that are read from the database 112) for the parameter set selected.

Alternatively, all parameter sets may be returned (e.g., presented, displayed, etc.) as the list 310 if no selections 210 are specified prior to the user submitting the search request to the servers 106 or 108 (i.e., when the customer selects an engine and an application but does not specify any criteria). When the user selects one of the parameter sets 310, a request is generally sent (i.e., presented, communicated, etc.) to the Web server 108. The web servers 106 (or alternatively, 108) may generate a report (described below in connection with FIGS. 4(a–c)) that lists the default configuration parameters for the application 204 that matches the customer request. The default parameter report may be substantially identical to the vendor Verification Report that is generated when the customer orders an engine. The user can generally request the generation of at least one report for each of the parameter sets 310.

Figure 4B:
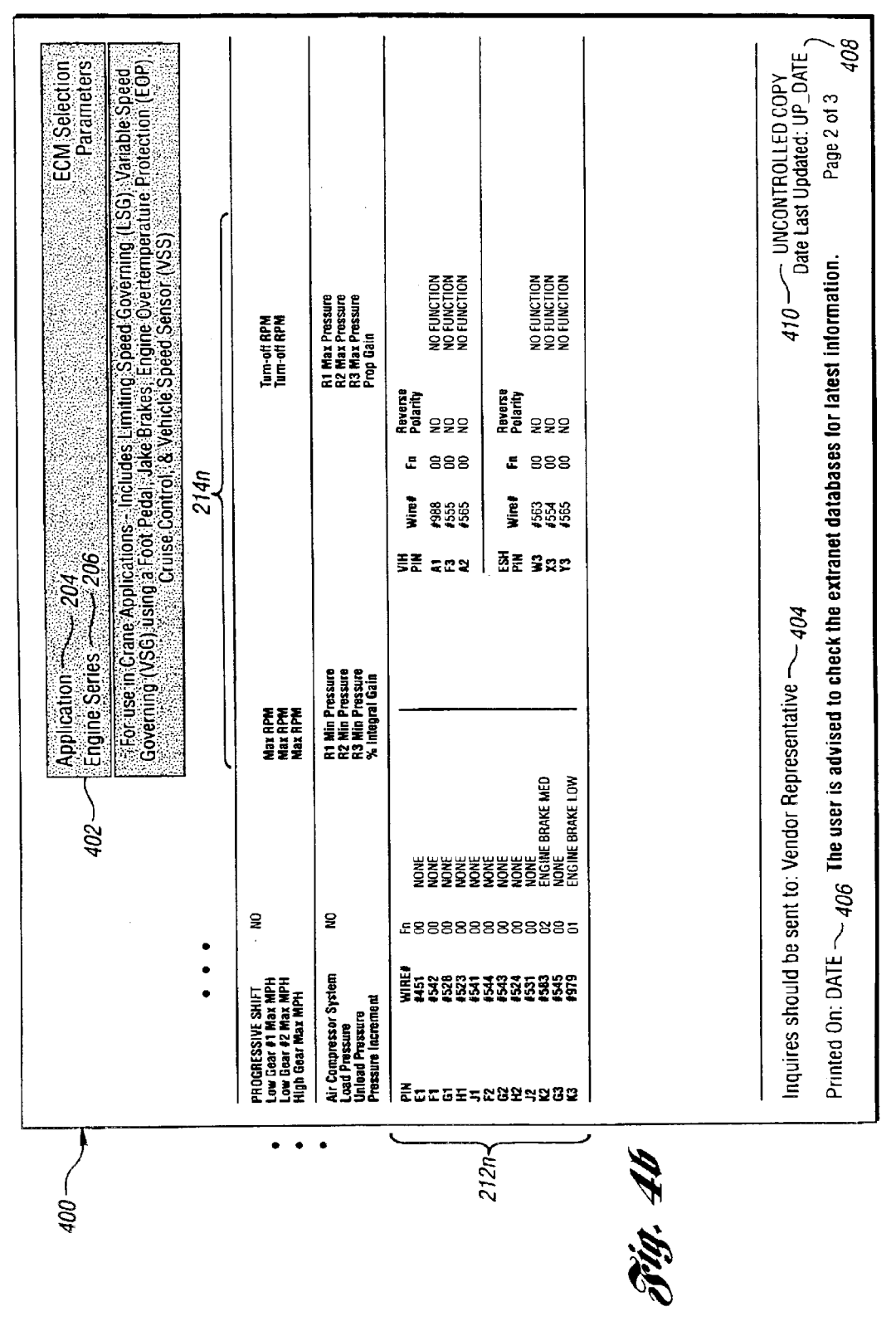

Referring to FIGS. 4(a–c), diagrams 400 illustrating summary and option parameter set information in accordance with a preferred embodiment of the present invention are shown. FIGS. 4(a–b) illustrate one example of a default selection parameters summary report (e.g., a two page display) that may be generated via the server 108 application and displayed to the user via the display 120.

The report 400 generally comprises a title block 402 that includes the application (e.g., installation environment) 204 and the engine series 206. The body of the report 400 generally comprises rows that are related to the engine parameters 212 and the respective columns that correspond to the particular respective parameters 214. The display 400 may include a name of a customer contact vendor representative 404, a report print date 406 containing a value (e.g., DATE), a field 408 having a value (e.g., UP_DATE) to indicate when the last update was performed on the data presented (e.g., the data in the parameters 212 and 214), and an indicator 410 that describes the report 400 as "uncontrolled" (i.e., subject to subsequent update).

Referring to FIG. 4c, a report 400 illustrating a summary of installations (e.g., markets, applications, etc.) for a particular parameter set is shown. At least one columns 420 (e.g., columns 420a–420n) may provide the user an availability listing of appropriate installations for the respective parameter set.

In one example, the report 400 may be generated in Portable Document Format (PDF). Formulating the document in PDF format generally provides the customer with a printable format that may be printed (printer not shown) from any computer that is capable of downloading the report 400. The document 400 may also be time stamped (e.g., using the field 406) and marked as an UNCONTROLLED COPY (e.g., using the field 410) such that the customer knows that the information on the Verification Report can change at any time. The PDF format also helps protect the electronic copy of the document against update, thus reducing or preventing any tampering with the information contained therein. The customers can generally save the document 400 for later printing (storage or memory not shown), but generally cannot alter the contents of the document 400.

In other examples, the report 400 may be generated in any one or more of the a tagged image file format (TIFF), a portable network graphics (PNG) format, an image (IMG) format, a file definition language (FDL) format, an advanced function presentation (AFP) format, a graphic interchange format (GIF), an extensible markup language (XML) format, and a comma separated value(s) (CVS) format, similarly to the PDF format. However, the report 400 may be generated in at least one of any appropriate formats to meet the design criteria of a particular application. The at least one format implemented to generate the report 400 may have at least one of the advantages of the PDF format as indicted above.

Figure 5:
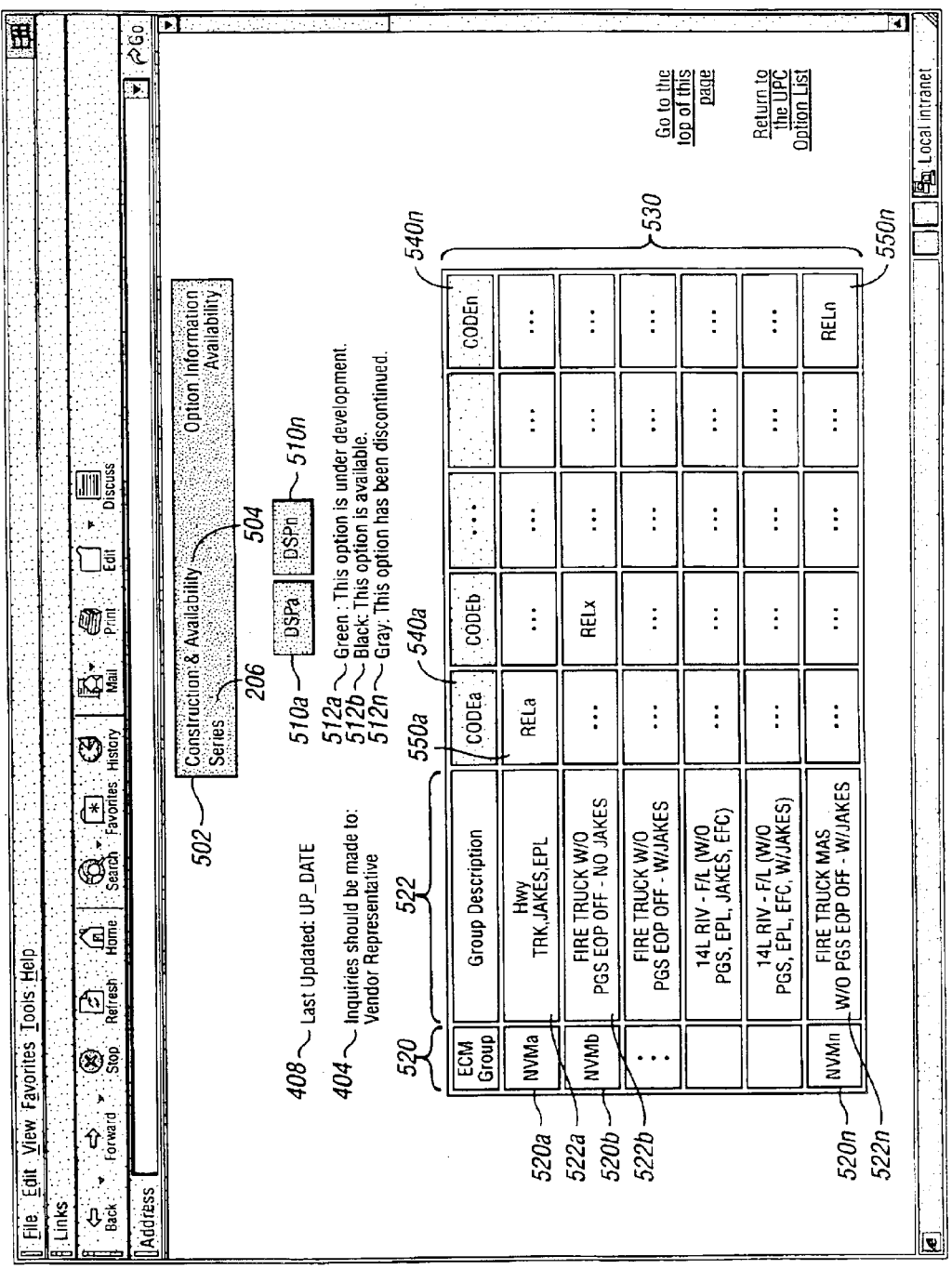
FIG. 5 is a diagram of another screen image in accordance with the present invention.

Referring to FIG. 5, a screen 500 illustrating a report of all respective parameter sets released to the models for the application (e.g., the application 204) and engine series (e.g., the engine series 206) previously selected is shown. The screen 500 generally displays the availability of parameter sets that may be appropriate for a particular market (e.g., installation, application, customer usage, etc.). The screen 500 is generally displayed when the user does not identify (or specify) parameter set criteria (e.g., when the user does not specify criteria 214 or a parameter set as illustrated in screen 400). As described in detail below in connection with FIG. 6, the user may make an appropriate menu selection, and then scroll the appropriate group listings for the particular parameter set. The user may click on (or otherwise select) the appropriate link, which will display a table of all of the respective parameter sets released to the models for the application and engine series previously selected (e.g., the report 500).

The report 500 generally comprises a title block 502 that includes the engine series 206 and an installation category 504. The category 504 may be more general than the application 204. For example, a category 504 may relate to construction and industrial applications, while the application 204 may be related to crane applications. The display 500 may further comprise the update data 408, engine displacement option selection icons 510 (e.g., icons 510a–510n), at least one availability status indicator 512 (e.g., status indicators 512a–512n), a column 520, a column 522, and a grid (or matrix) 530. When an engine series 206 contains more than one displacement engine in an engine family, the user may select a particular engine displacement related to at least one parameter set using the icon 510.

The availability of the parameter set (e.g., the parameter set is obsolete, currently available, and planned for future availability) is generally indicated using the indicator 512. The indicator 512 may be implemented as a color coded display of the respective parameter set availability. However, the indicator 512 may be implemented as any appropriate indicator to meet the design criteria of a particular application.

The column 520 generally comprises rows 520a–520n that include the at least one parameter set number (e.g., NUMa–NUMn) corresponding to parameter sets in a particular parameter set. When the specific parameter set link is selected (e.g., a NUM icon is clicked) by the user, the parameter set default values may be displayed in the Verification Report format (e.g., as the report 400). The column 522 generally includes at least one description (e.g., descriptions 522a–522n) that corresponds to a respective parameter set 520a–520n.

The grid 530 generally comprises a row of at least one parameter set code 540 (e.g., codes 540a–540n) as identified by the respective alphanumeric indicator CODEa–CODEn, and a respective release date (e.g., dates 550a–550n as indicated by RELa–RELn) for each released parameter set and code.

The selection tools (e.g., programs, routines, steps, etc.) of the present invention that generate the screens 200, 300, 400, and 500 may be used to assist distributors and customers in selecting at least one appropriate parameter set, and facilitate the release of new parameter sets by identifying additional customer needs.

Figure 6:
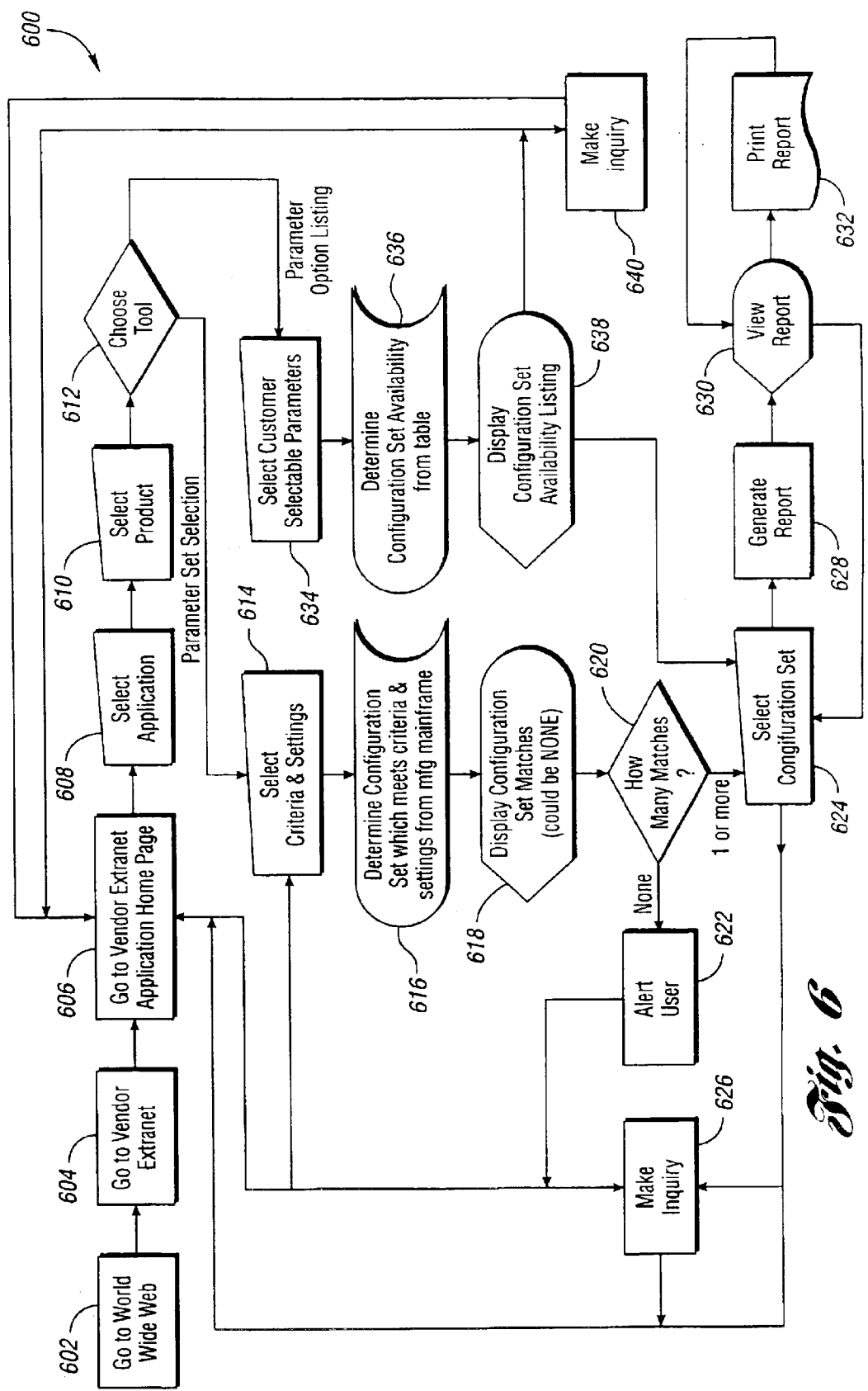
FIG. 6 is a flow chart of an engine controller parameter set selection process in accordance with the present invention.

Referring to FIG. 6, a flow diagram illustrating an ECM parameter (or configuration) set selection process (i.e., operation, method, steps, etc.) 600 in accordance with a preferred embodiment to the present invention is shown. The operation 600 may be implemented in connection with the system 100. However, the method 600 may be implemented in connection with any appropriate computer system to meet the design criteria of a particular application. The process 600 may generate at least one of the screen displays 200, 300, 400, and 500. However, the process 600 may provide the user information via any appropriate format to meet the design criteria of a particular application.

The user may go to (or access) the World Wide Web 104 via (or using) the access device 102 (block 602). The user may access (or got to) the vendor extranet (block 604). The user may go to (or access) the selection application home page (block 606) generally by selection of the appropriate option (e.g., clicking on a particular icon) at the vendor extranet.

The user may select an application (e.g., installation, market, usage, etc.) such as the application 204 (block 608). The user may select a product (e.g., an engine series 206) (block 610). The application and product selection is generally implemented using at least one drop-down menu (not shown). The engines, applications, criteria and settings that the user may select (i.e., identify, specify, choose, etc.) are generally stored in at least one of the tables corresponding to the server 108, and the databases 110, 112, and 114. The user may select (or choose) a parameter set selection tool (e.g., a selection program and an options listing) (decision block 612).

In one mode of operation, when the user selects the parameter (or configuration) set selection routine leg of the decision block 612, the user may select (i.e., identify, specify, choose, etc.) at least one criteria (e.g., characteristic, etc.) and at least one setting (e.g., on, off, enabled, disabled, etc.) as at least one criteria (i.e., feature, function, etc.) related to an ECM parameter set (block 614). For example, the user may access and complete the screen 200. The method 600 (e.g., programming implemented in connection with the server 108) may determine at least one ECM parameter set (or configuration set) (e.g., the report 300) that may meet (i.e., match) the selected (or desired) customer parameters (or criteria) and settings (block 616). The existing matching parameter set may be determined in connection with information that is stored (or resides) in at least one of the databases 110, 112, and 114 and/or at least one table in the server 108. When the method 600 determines that there is at least one existing parameter set that matches the customer specified criteria, the method 600 may display the ECM parameter (or configuration) set matches (block 618). The parameter set matches are generally displayed as the search results report 300 and parameter set report 400 via the display 120. When the user does not specify any criteria, the present invention generally displays all parameter sets that correspond to the selected engine and application (e.g., the report 500).

A search engine (not shown) implemented in connection with the process 600 is generally unrestricted as to the number of criteria and respective settings (e.g., on, off, enabled, disabled, etc.) that the user may request. Therefore, the user may select no criteria, one criteria, or multiple criteria. As such, the process 600 may determine an exact, close, or no matching parameter set.

The process 600 may display no matching selected parameter set to the customer (or user) specified criteria, or one or more matches (decision block 620). When the process 600 determines that there are no matches to the user selected criteria and settings, the process 600 may present an alert (block 622). The alert is generally in the form of a message (or signal) presented on the display 120. In response to the alert, the user may make an inquiry to the system (block 626) including a request for implementation of a (new) matching parameter set. In addition or alternatively, the user may return to the vendor extranet application home page (i.e., return to block 606). The inquiry block 626 may facilitate the selection of a matching parameter set (e.g., direct the user to at least one ECM that may have a parameter set that are close to matching the user selected criteria).

When the process 600 determines one or more matches to the selected parameter set criteria and settings, the user may select a particular one of the at least one matching parameter set for display (block 624). The at least one matching configuration set is generally displayed as the screen image (or report) 400 via the display 120. When the at least one matching parameter set is displayed, in one mode of operation, the user may make an inquiry to the system 100 (e.g., block 626). In another mode of operation, the user may select a particular page of a screen 400 to generate a report (block 628). The user may view the report (block 630), generally using the display 120. In one mode of operation, the user may print the report (block 632) and the report is generally available to view again (i.e., the process 600 generally returns to the block 630). In another mode of operation the process 600 may return to the block 624 and display at least one matching parameter set.

Returning to the decision block 612, in another mode of operation, the process 600 may determine a parameter (or configuration) option listing when the user selects that respective leg of the decision block 612. The user may select at least one respective engine and/or application parameter (e.g., the user may perform a selection process as indicated via the screen 200) (block 634). The selection of the at least one engine application and engine is generally made using an ECM drawings and option information icon such as (or similar to) at least one icon 230. However, in another mode of operation, the customer (or user) may select (i.e., specify, choose, pick, etc.) no parameter set. When the user does not specify any parameter set, the present invention generally displays all parameter sets that correspond to the selected engine and application (e.g., the screen 500).

The method 600 may determine the respective parameter (or configuration) set availability (i.e., the method 600 may determine at least one parameter set corresponding to the at least one selected parameter set). The ECM parameter set availability determination is generally performed using information (or data) that is stored in the at least one of the extranet 108 table, and the databases 110, 112, and 114 (block 636). As such, the process 600 may determine what customer selectable parameter sets any given vendor ECM may be configured to when the respective ECM is manufactured (i.e., an as manufactured parameter set).

The method 600 may display at least one ECM parameter set availability listing (e.g., the screen 500 including usage and release date). In one mode of operation the process 600 may transition to the block 624. In another mode of operation the process 600 may make an inquiry (block 640). The block 640 may operate similarly to the block 626. In yet another mode of operation, the process 600 may return to the block 606 (i.e., an extranet application homepage).

A search engine (not shown) implemented in connection with the process 600 is generally unrestricted as to the number of parameters within the specified parameter set and respective settings (e.g., on, off, enabled, disabled, etc.) that the user may request. Therefore, the user may select (or specify) no parameter set, a one parameter set, or multiple parameters within a set. As such, the process 600 may determine an exact, close, or no matching parameter set.

As is readily apparent from the foregoing description, then, the present invention generally provides an improved system and method for ECM feature based programming parameter set selection. In one example, the improved system and method for determining a parameter set of the present invention may assist distributors and customers with the selection of appropriate parameter sets to find the closest match based on customer identified (or specified) criteria, thus saving time, reducing the likelihood of improper ECM selection, improving customer satisfaction, and reducing or eliminating reprogramming. In another example, the improved method and system of the present invention may allow the customer to not specify particular criteria for a given engine and application and thus, determine all appropriate parameter sets.

Such an improved system and method may provide a single interface (e.g., an extranet Web site) that performs the tasks of three different business systems (e.g., user information, searches, determination of controller group, parameter selection, etc.). The improved system and method of the present invention may be used by a vendor representative to assist ECM distributors and customers to select appropriate parameter sets, manage existing parameter sets, eliminate duplication of parameter sets, and facilitate the release and implementation of new parameter sets.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of determining an engine controller module (ECM) parameter set, the method comprising:

specifying at least one criteria using at least one access device;

determining whether at least one existing parameter set matches the specified criteria;

presenting a report that indicates at least one matching parameter set when there is at least one matching parameter set; and presenting an alert when there is no matching parameter set, wherein the method is implemented via an ECM vendor extranet on a World Wide Web server.

2. The method of claim 1 further comprising selecting an application for the specified criteria and selecting an engine to be implemented in connection with the specified criteria.

3. The method of claim 2 wherein the engine comprises a compression ignition engine.

4. The method of claim 1 wherein the at least one specified criteria comprises at least one of a type of transmission, engine speed governing, engine protection strategy, digital and analog inputs, digital and analog outputs, fan controls, and throttle controls.

5. The method of claim 1 further comprising determining as manufactured parameter sets for the at least one matching existing parameter set.

6. The method of claim 1 wherein the at least one existing parameter set is stored in at least one of an extranet server table, a manufacturing database, and a bill of material database.

7. The method of claim 1 wherein the number of specified criteria is unrestricted and matching comprises at least one of an exact matching parameter set, a close matching parameter set, and no matching parameter set.

8. The method of claim 1 further comprising facilitating a request for a new selection of at least one parameter set when there is no matching parameter set.

9. The method of claim 1 further comprising determining existing parameter set obsolescence, current availability, and future availability.

10. The method of claim 1 further comprising providing pop-up help windows with technical descriptions of the at least one specified criteria.

11. A method of determining engine controller module (ECM) parameter set availability, the method comprising:
   specifying at least one parameter set using at least one access device;
   determining at least one existing parameter set that matches the at least one specified parameter set; and
   presenting a report that indicates at least one application and at least one release date corresponding to the matching parameter set, wherein the method is implemented via an ECM vendor extranet on a World Wide Web server.

12. The method of claim 11 further comprising selecting an application and selecting an engine, and not specifying at least one parameter set.

13. The method of claim 12 wherein the engine comprises a compression ignition engine.

14. The method of claim 11 wherein the at least one parameter set comprises at least one of a type of transmission, engine speed governing, engine protection strategy, digital and analog inputs, digital and analog outputs, fan controls, and throttle controls.

15. The method of claim 11 wherein the at least one existing parameter set is stored on at least one of an extranet server table, a manufacturing database, and a bill of material database.

16. The method of claim 11 wherein the number of specified parameters is unrestricted and matching comprises an exact matching parameter set, a close matching parameter set, and no matching parameter set.

17. The method of claim 11 further comprising determining existing parameter set obsolescence, current availability, and future availability.

18. A computer system for selecting an engine controller module (ECM) parameter set, the system comprising:
   at least one access device for specifying at least one criteria;
   at least one database for storing at least one existing parameter set; and
   an extranet server for matching the at least one specified criteria to the at least one existing parameter set.

19. The system of claim 18 wherein the extranet server is a World Wide Web ECM vendor extranet server.

20. The system of claim 18 wherein the at least one database is at least one of an extranet server table, a manufacturing database, and a bill of material database.

* * * * *